US011888218B2

(12) United States Patent
Abiri et al.

(10) Patent No.: US 11,888,218 B2
(45) Date of Patent: Jan. 30, 2024

(54) METHOD AND APPARATUS FOR REDUCING SURFACE WAVES IN PRINTED ANTENNAS

(71) Applicant: California Institute of Technology, Pasadena, CA (US)

(72) Inventors: Behrooz Abiri, Pasadena, CA (US); Florian Bohn, Pasadena, CA (US); Seyed Ali Hajimiri, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 28 days.

(21) Appl. No.: 16/140,421

(22) Filed: Sep. 24, 2018

(65) Prior Publication Data

US 2019/0198987 A1 Jun. 27, 2019

Related U.S. Application Data

(60) Provisional application No. 62/537,349, filed on Jul. 26, 2017.

(51) Int. Cl.

| | |
|---|---|
| ***H01Q 9/04*** | (2006.01) |
| ***H01Q 1/38*** | (2006.01) |
| ***H01Q 9/06*** | (2006.01) |
| ***H01Q 19/02*** | (2006.01) |

(52) U.S. Cl.

CPC ............. *H01Q 1/38* (2013.01); *H01Q 9/0407* (2013.01); *H01Q 9/065* (2013.01); *H01Q 19/021* (2013.01)

(58) Field of Classification Search

CPC ......... H01Q 1/38; H01Q 9/0407; H01Q 9/065

See application file for complete search history.

(56) References Cited

U.S. PATENT DOCUMENTS

| | | | | | |
|---|---|---|---|---|---|
| 4,197,544 | A * | 4/1980 | Kaloi | H01Q 1/48 | 343/700 MS |
| 4,291,312 | A * | 9/1981 | Kaloi | H01Q 1/48 | 343/700 MS |
| 6,181,279 | B1 * | 1/2001 | Van Hoozen | H01Q 1/52 | 343/700 MS |
| 7,623,073 | B2 * | 11/2009 | Teshirogi | H01Q 1/521 | 343/700 MS |
| 9,742,072 | B2 * | 8/2017 | Junemann | H01Q 5/378 | |
| 2007/0080864 | A1 * | 4/2007 | Channabasappa | H01Q 13/18 | 343/700 MS |
| 2011/0057853 | A1 * | 3/2011 | Kim | H01Q 1/48 | 343/843 |

(Continued)

*Primary Examiner* — Hasan Islam

(74) *Attorney, Agent, or Firm* — Weaver Austin Villeneuve & Sampson LLP

(57) ABSTRACT

An antenna, includes in part, a metal piece formed on a surface of a substrate and configure to radiate electromagnetic waves, a metal feed formed in the substrate and configure to supply electrical signal to the metal piece, and a multitude of metallic walls formed in the substrate and enclosing the metal piece. The antenna may be a patch antenna, a monopole antenna, or a dipole antenna. Each metallic wall may include a via that is fully or partially filled by a metal, or an electroplated tub formed in the substrate. The antenna further includes, in part, a metallic trace formed on the surface of the substrate and enclosing the antenna. The substrate may be a printed circuit board.

4 Claims, 4 Drawing Sheets

(56) References Cited

U.S. PATENT DOCUMENTS

| | | | | |
|---|---|---|---|---|
| 2013/0187830 | A1* | 7/2013 | Warnick | H01Q 9/0428 343/893 |
| 2014/0051228 | A1* | 2/2014 | Chausse | H01L 21/76224 438/424 |
| 2016/0261039 | A1* | 9/2016 | Parsche | H01Q 9/0407 |
| 2016/0276751 | A1* | 9/2016 | Ueda | H01Q 9/0407 |
| 2017/0179585 | A1* | 6/2017 | Kaufmann | H01Q 5/357 |
| 2017/0194270 | A1* | 7/2017 | Webb | H01Q 9/065 |
| 2017/0331193 | A1* | 11/2017 | Xue | H01Q 9/0428 |

* cited by examiner

--PRIOR ART--

--PRIOR ART--

METHOD AND APPARATUS FOR REDUCING SURFACE WAVES IN PRINTED ANTENNAS

CROSS REFERENCE TO RELATED APPLICATIONS

The present application claims benefit under 35 USC 119(e) of Application Ser. No. 62/537,349, filed Jul. 26, 2017, the content of which is incorporated herein by reference in its entirety.

FIELD OF THE INVENTION

The present invention relates to antennas, and more particularly to printed antennas.

BACKGROUND OF THE INVENTION

Printed antennas, such as patch antennas, have been widely used where low profile, flat, or conformal footprint is required. The ease of production of such antennas makes them attractive for mass production and consumer products. In order to reduce the energy loss in the metal structures of such antennas, relatively thick substrates may be used. However, as the substrates becomes thicker, the energy loss in the substrate due to surface waves increases.

FIG. 1A is a cross-sectional schematic view of a patch antenna 10 formed on a printed circuit board (PCB) 15. Antenna 10 is configured to radiate electromagnetic waves in response to the electric signal it receives via metallic antenna feed 30. Positioned below PCB 15 is ground plane 20. Also shown in FIG. 1 are surface waves 25. FIG. 1B is a top view of PCB 15 showing patch antenna 10 and antenna feed 30. The surface waves pose challenges in, for example, phased arrays by increasing the coupling between adjacent elements. Such coupling results in undesirable phase pulling.

BRIEF SUMMARY OF THE INVENTION

An antenna, in accordance with one embodiment of the present invention, includes in part, a metal piece formed on a surface of a substrate and configure to radiate electromagnetic waves, a metal feed formed in the substrate and configure to supply electrical signal to the metal piece, and a multitude of metallic walls formed in the substrate and enclosing the metal piece.

In one embodiment, the antenna is a patch antenna. In one embodiment, the antenna is a monopole antenna. In one embodiment, the antenna is a dipole antenna. In one embodiment, each metallic wall includes a via that is fully or partially filled by a metal. In one embodiment, each metallic wall is an electroplated tub formed in the substrate.

In one embodiment the antenna further includes, in part, a metallic trace formed on the surface of the substrate and enclosing the antenna patch. In one embodiment, the substrate is a printed circuit board.

A method of radiating an electromagnetic waves from an antenna formed on a substrate includes, in part, supplying an electrical signal through a metallic feed formed in the substrate, and applying a ground potential to a multitude of metallic walls formed in the substrate and enclosing the antenna.

In one embodiment, the antenna is a patch antenna. In one embodiment, the antenna is a monopole antenna. In one embodiment, the antenna is a dipole antenna. In one embodiment, each metallic wall includes a via that is fully or partially filled by a metal. In one embodiment, each metallic wall is an electroplated tub formed in the substrate.

In one embodiment, the method further includes, in part, applying a ground potential to a metallic trace formed on the surface of the substrate and enclosing the antenna patch. In one embodiment, the substrate is a printed circuit board.

BRIEF DESCRIPTION OF THE DRAWINGS

FIG. 1A is a cross-sectional schematic view of a patch antenna, as known in the prior at.

DETAILED DESCRIPTION OF THE INVENTION

In accordance with embodiments of the present invention, a printed antenna, such as a patch antenna, formed above a substrate, such as a printed circuit board (PCB), is enclosed with electrically conductive walls that are connected to the ground potential, thereby to prevent or substantially reduce propagation of the surface waves in the substrate. In one embodiment, the conductive walls may be formed in closely spaced vias formed around the antenna.

Figure 1A:
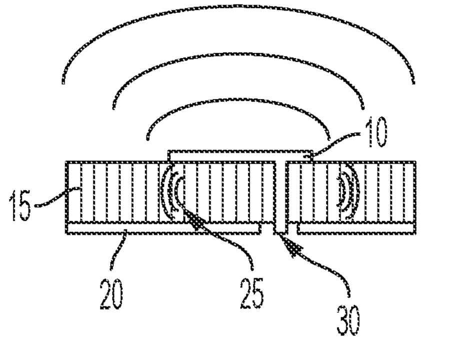
Figure 1B:
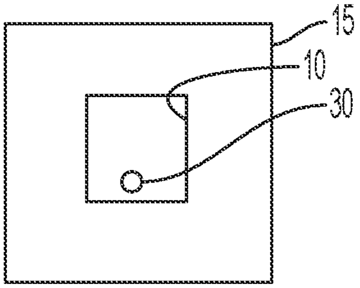
FIG. 1B is a top view of the patch antenna shown in FIG. 1A.
Figure 2A:
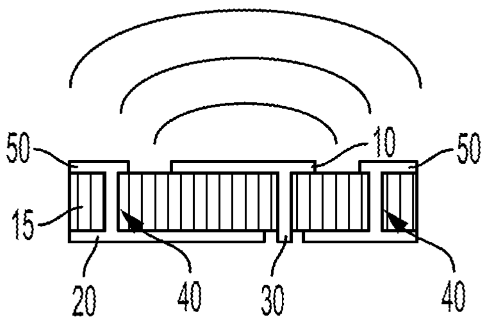
FIG. 2A is a cross-sectional schematic view of a patch antenna, in accordance with one embodiment of the present invention.

FIG. 2A is a cross-sectional schematic view of a patch antenna 10 formed on a PCB 15, in accordance with one embodiment of the present invention. Patch antenna 10 is configured to radiate electromagnetic waves in response to the electric signal it receives via metallic antenna feed 30. Positioned below PCB 15 is ground plane 20. To eliminate or substantially reduce surface waves, patch antenna 10 is enclosed with conductive walls 40 that are formed in substrate 15 and connected to ground plane 20. Metal traces 50 are configured to shield any routing and circuitry that may be present around antenna 10.

Figure 2B:
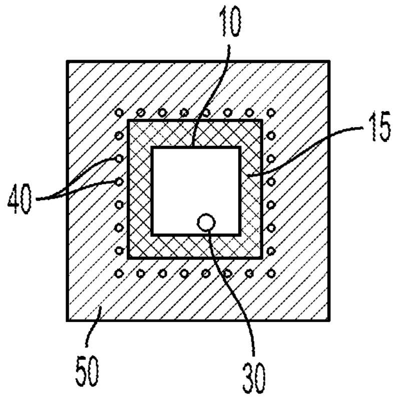
FIG. 2B is a top view of the patch antenna shown in FIG. 2A, in accordance with one embodiment of the present invention.

FIG. 2B is a top view of patch antenna 10 and antenna feed 30 of FIG. 2A. Metal trace 50 is shown as enclosing patch antenna 10. Conductive walls 40 formed in substrate 15 are also shown as enclosing patch antenna 10.

Figure 2C:
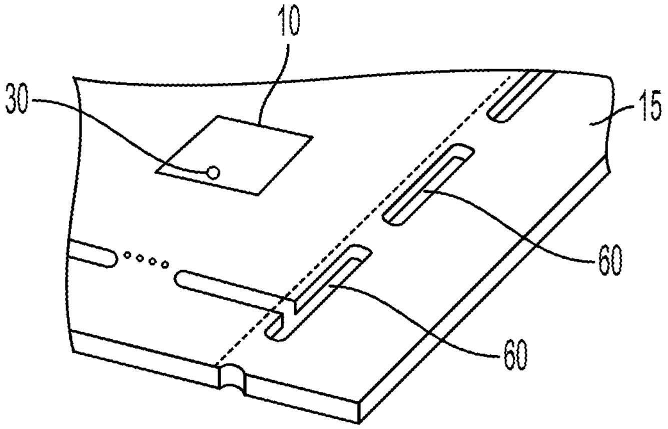
FIG. 2C is a top view of the patch antenna shown in FIG. 2A, in accordance with another embodiment of the present invention

In one embodiment, conductive walls may be formed by creating vias in PCB 15 and filling the vias, either partially or fully, along the depth of the vias, with a metal such as copper, as is shown for example, in FIGS. 2A, 2B and 2C.

The distance between each pair of adjacent vias is less than the wavelength of the electromagnetic wave being radiated by patch antenna 10.

In accordance with another embodiment, the conductive walls may be formed by creating a number of moats in the PCB around the patch antenna and then electroplating the interior sides of the moats with conductive material such as copper. FIG. 2C shows a PCB 15 that includes a multitude of moats 60 enclosing patch antenna 10. The interior sides of the moats are electroplated to form conductive walls around patch antenna 10. The conductive walls, such as the ones shown in FIGS. 2A and 2B, reflect the surface waves back in the region (also referred to herein as a tub) formed between the walls 40 in the PCB, thereby preventing the energy loss otherwise caused by the surface waves. As a result of such reflections, the surface waves cancel out each other as long as the dimensions of the tub is not resonant at the radiation frequency. If the surface waves are resonant, the reflected surface waves amplify each other and radiate out of the tub through the antenna and thus contribute to the radiated waves.

Figure 3A:
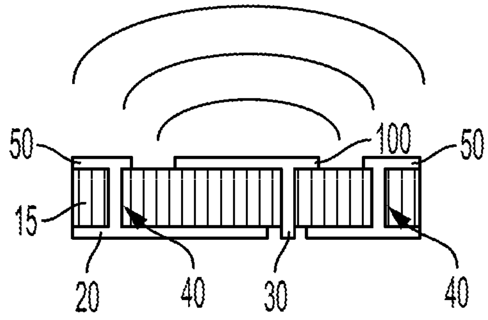
FIG. 3A is a cross-sectional schematic view of a patch antenna, in accordance with one embodiment of the present invention.

FIG. 3A is a cross-sectional schematic view of a monopole antenna 100 formed on a PCB 15, in accordance with one embodiment of the present invention. Monopole antenna 10 is configured to radiate electromagnetic waves in response to the electric signal it receives via metallic antenna feed 30. Positioned below PCB 15 is ground plane 20. To eliminate or substantially reduce surface waves, monopole antenna 100 is enclosed with conductive walls 40 that are formed in substrate 15 and connected to ground plane 20. Metal traces 50 are configured to shield any routing and circuitry that may be present around antenna 10.

Figure 3B:
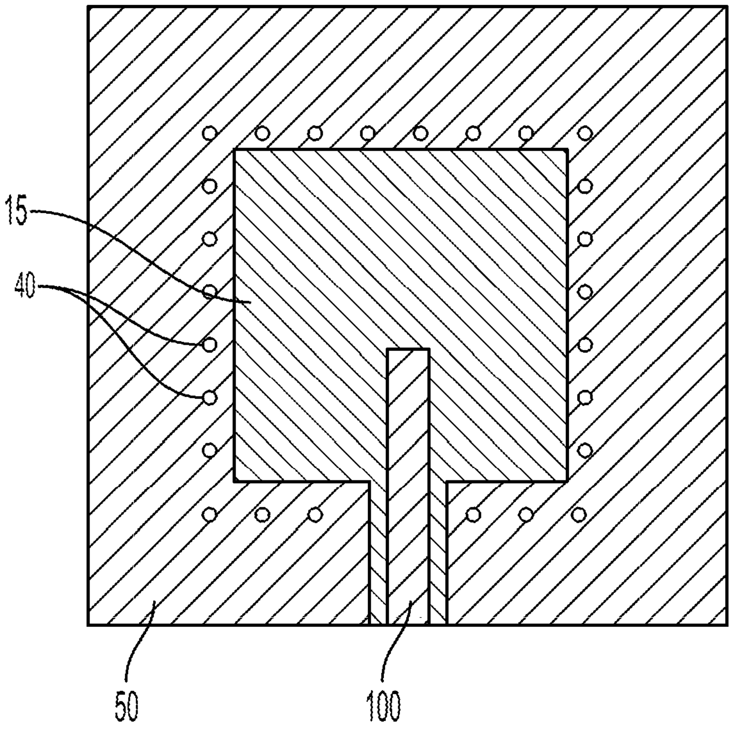
FIG. 3B is a top view of the patch antenna shown in FIG. 2A, in accordance with one embodiment of the present invention.

FIG. 3B is a top view of monopole antenna 100 and antenna feed 30 of FIG. 3A. Metal trace 50 is shown as enclosing monopole antenna 100. Conductive walls 40 formed in substrate 15 are also shown as enclosing monopole antenna 100.

In one embodiment, conductive walls may be formed by creating vias in PCB 15 and filling the vias, either partially or fully, along the depth of the vias, with a metal such as copper, as is shown for example, in FIGS. 3A and 3B. The distance between each pair of adjacent vias is less than the wavelength of the electromagnetic wave being radiated by monopole antenna 100. In one embodiment, the PCB substrate has a thickness (depth) of nearly one quarter of the wavelength of the signal being transmitted by monopole antenna 100.

In accordance with another embodiment, the conductive walls may be formed by creating a number of moats in the PCB around the monopole antenna and then electroplating the interior sides of the moats with conductive material such as copper, similar to that shown in FIG. 2C.

Figure 4A:
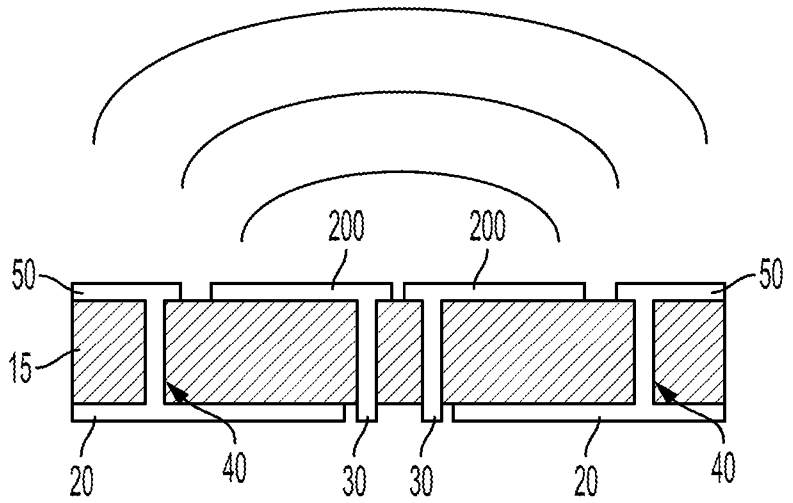
FIG. 4A is a cross-sectional schematic view of a patch antenna, in accordance with one embodiment of the present invention.

FIG. 4A is a cross-sectional schematic view of a dipole antenna 200 formed on a PCB 15, in accordance with one embodiment of the present invention. Dipole antenna 200 is configured to radiate electromagnetic waves in response to the electric signal it receives via metallic antenna feeds 30. Positioned below PCB 15 is ground plane 20. To eliminate or substantially reduce surface waves, dipole antenna 200 is enclosed with conductive walls 40 that are formed in substrate 15 and connected to ground plane 20. Metal traces 50 are configured to shield any routing and circuitry that may be present around antenna 200.

Figure 4B:
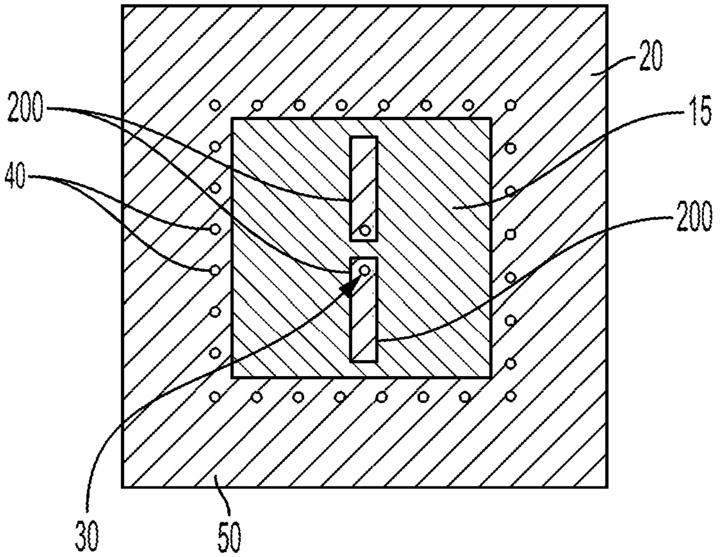
FIG. 4B is a top view of the patch antenna shown in FIG. 2A, in accordance with one embodiment of the present invention.

FIG. 4B is a top view of dipole antenna 200 and antenna feeds 30 of FIG. 4A. Metal trace 50 is shown as enclosing dipole antenna 200. Conductive walls 40 formed in substrate 15 are also shown as enclosing dipole antenna 200.

In one embodiment, conductive walls may be formed by creating vias in PCB 15 and filling the vias, either partially or fully, along the depth of the vias, with a metal such as copper, as is shown for example, in FIGS. 4A and 4B. The distance between each pair of adjacent vias is less than the wavelength of the electromagnetic wave being radiated by dipole antenna 100. In one embodiment, the PCB substrate has a thickness of nearly one quarter of the wavelength of the signal being transmitted by the dipole antenna 100.

In accordance with another embodiment, the conductive walls may be formed by creating a number of moats in the PCB around the dipole antenna and then electroplating the interior sides of the moats with conductive material such as copper, similar to that shown in FIG. 2C.

The above embodiments of the present invention are illustrative and not limitative. The embodiments of the present invention are not limited by the type or dimensions of the antenna. The above embodiments of the present invention are not limited by the wavelength or frequency of the signal being transmitted. Other modifications and variations will be apparent to those skilled in the art and are intended to fall within the scope of the appended claims.

What is claimed is:

1. A monopole, dipole or patch antenna comprising:

one or two planar metal pieces formed on a top surface of a substrate and configured to radiate electromagnetic waves;

a ground plane formed on a bottom surface of the substrate;

an off-center metal feed formed in the substrate and configured to supply an electrical signal to the one or two metal pieces, said metal feed being orthogonally connected to the one or two metal pieces;

a planar metal shield structure formed on the top surface of the substrate and electrically separated from the one or two metal pieces on four sides; and a plurality of tubs formed in the substrate and symmetrically enclosing the one or two metal pieces on the four sides, wherein the tubs are electrically connected between the metal shield structure and the ground plane, and wherein interior sides of the tubs are electroplated to form conductive walls around the one or two metal pieces, such that the conductive walls reflect surface waves in a tub region formed between the conductive walls of the antenna;

wherein said one or two metal pieces are arranged on a center region of the top surface.

2. The antenna of claim 1, wherein said substrate is a printed circuit board.

3. A method of radiating electromagnetic waves from a monopole, dipole or patch antenna comprising one or two planar metal pieces formed on a top surface of a substrate, the method comprising:

applying a ground potential to a ground plane formed on a bottom surface of the substrate;

supplying an electrical signal to the one or two metal pieces through an off-center metal feed formed in the substrate, said metal feed being orthogonally connected to the one or two metal pieces;

applying the ground potential to a planar metal shield structure formed on the top surface of the substrate, wherein the metal shield structure is electrically separated from the one or two metal pieces on four sides; and applying the ground potential to a plurality of tubs formed in the substrate and symmetrically enclosing the one or two metal pieces on four sides, wherein interior sides of the tubs are electroplated to form conductive walls around the one or two metal pieces, such that the conductive walls reflect surface waves in a tub region formed between the conductive walls of the antenna;

wherein said one or two metal pieces are arranged on a center region of the top surface.

4. The method of claim 3, wherein said substrate is a printed circuit board.

* * * * *